(12) United States Patent
Chen et al.

(10) Patent No.: US 6,466,736 B1
(45) Date of Patent: ***Oct. 15, 2002

(54) INTEGRATED DVD/CD CONTROLLER

(75) Inventors: Kong-Chen Chen, San Jose, CA (US); Chris Tsu, San Jose, CA (US); Wen Hsu, Saratoga, CA (US)

(73) Assignee: Oak Technology, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 09/224,138

(22) Filed: Dec. 31, 1998

(51) Int. Cl.⁷ ................................................. H04N 5/91
(52) U.S. Cl. ....................................... 386/126; 386/111
(58) Field of Search ........................... 386/46, 98, 105, 386/111, 112, 125, 126, 96, 104, 106; 370/395

(56) References Cited

U.S. PATENT DOCUMENTS

| | | | | |
|---|---|---|---|---|
| 5,926,606 A | * | 7/1999 | Wang | 386/125 |
| 5,963,705 A | * | 10/1999 | Kim et al. | 386/126 |
| 6,026,088 A | * | 2/2000 | Rostoker et al. | 370/395 |
| 6,177,892 B1 | * | 1/2001 | Ko | 341/106 |
| 6,263,023 B1 | * | 7/2001 | Ngai | 375/240.12 |

* cited by examiner

*Primary Examiner*—Huy Nguyen
(74) *Attorney, Agent, or Firm*—Townsend and Townsend and Crew LLP; Steven J. Cahill

(57) ABSTRACT

A controller architecture optimized for processing audio and video information in playback systems used for reproducing information stored on optical discs such as CDs and DVDs. The controller uses a unique parallel interface to facilitate the transfer of CD data and DVD data from the controller to a MPEG decoder. The controller also performs servo control operations, data processing and error detection and correction operations for CD data and DVD data, and provides shared memory resources for internal operations of the controller. DVD/CD playback systems incorporating the present invention occupy less real estate, have smaller pin counts, are less complex, and are cheaper to manufacture than conventional playback systems.

12 Claims, 6 Drawing Sheets

INTEGRATED DVD/CD CONTROLLER

CROSS-REFERENCES TO RELATED APPLICATIONS

The present application incorporates by reference for all purposes the disclosure of U.S. patent application Ser. No. 09/224,452 filed Dec. 31, 1998 now U.S. Pat. No. 6,177,892, entitled "EFM/DVD DEMODULATOR" which is being filed concurrently with the present application.

BACKGROUND OF THE INVENTION

The present invention relates generally to systems for reproducing information stored on storage media such as optical discs and more particularly to an integrated apparatus and method for facilitating the reproduction of information read from optical storage discs of different types such as digital video discs (DVDs) and compact discs (CDs).

The transition of audio and video storage from the analog domain to the digital domain has revolutionized the way in which audio and video information is distributed to consumers. For example, digital optical storage media such as CDs and DVDs are quickly becoming the media of choice for distribution of information. The rising popularity of optical storage media, such as CDs and DVDs, has given rise to an expanding market for playback systems which are capable of reproducing information recorded on optical storage discs. Further, since the optical discs may store information encoded in different formats, playback systems which are capable of reading and reproducing information stored in various formats are preferred. Examples of such integrated playback systems include DVD/CD players which are capable of reading and reproducing information stored on CDs and DVDs.

FIG. 1 depicts a typical prior art playback system 1 used for reproducing information stored on CDs and DVDs. Traditional playback system 1 typically includes a disc motor 6 for rotating disc 2, an optical pickup (OPU) subsystem 4, a current-voltage (I/V) amplifier 8, a signal amplifier 10, a servo error detector 12, servo control subsystem 14, servo drivers 16, a read channel (RC) 18, a CD digital signal processor (CD-DSP) 22 along with its associated memory 24, a digital audio processor 34, a DVD DSP 26 along with its associated memory 28, a block decoder 30 along with its associated memory 32, an Advanced Technology Attachment Packet Interface (ATAPI) interface 36, a host system central processing unit (CPU) 38, a MPEG decoder 40 (MPEG-1 or MPEG-2) along with its associated memory 42, audio playback subsystem 44, video playback subsystem 46, a microcontroller 48 coupled with CD/DVD subsystems, and a microcontroller 49 coupled with MPEG decoder 40.

Disc motor 6 typically includes a spindle motor which rotates disc 2 to a desired speed. Servo drivers 16 output currents to disc motor 6 to drive and control the rate of rotations of motors contained in disc motor 6. Servo drivers 16 also output currents to OPU 4 to position OPU 4 on the desired location of disc 2, to focus the laser beam onto disc 2, and to track the recorded spiral pits on disc 2.

As disc 2 rotates, OPU 4 reads information stored on the CD or DVD by scanning the pits and lands on optical disc 2. OPU 4 may contain one or more lasers, optical elements, and associated electronic circuitry, and reads the information stored on disc 2 by detecting the laser beam reflected from disc 2. OPU 4 is usually mounted on a sled which physically positions OPU 4 over disc 2. OPU 4 is capable of reading information from both DVDs and CDs. I/V amplifier 8 converts the photo-diode currents generated by the reflected laser beam into voltages which are supplied to signal amplifier 10 which equalizes the signal representing information read from disc 2.

Servo error detector 12 generates servo error controls signals which are fed back to servo control subsystem 14. The servo error signals include a focus error signal, a tracking error signal, and a track-crossing pulse. Based on the servo error signals received from servo error detector 12, servo control subsystem 14 determines and controls the speed of rotation of disc 2 using servo drivers 16, and also adjusts the height and position of OPU 4 for reading information from disc 2.

Read channel (RC) subsystem 18 extracts bit clock and bit data information for CD and DVD from the output of signal amplifier 10. Read channel subsystem 18 also performs analog-to-digital conversion of the input analog signal. The digital bit stream generated by RC subsystem 18 is provided either to CD-DSP 22 or to DVD-DSP 26 depending on whether playback system 1 is operating in CD or in DVD mode.

CD-DSP 22 demodulates channel bits read from a CD into data bytes and performs error detection and correction on the data bytes. Memory 24 coupled to CD-DSP 22 facilitates de-interleaving operation, and error detection and correction operations. Audio processor 34 coupled with CD-DSP 22 may be used for CD audio playback. The output from CD-DSP 22 may be provided to block decoder 30 or to MPEG decoder 40 via a serial interface. Block decoder 30 performs data block error correction on the CD data and converts the data blocks received from CD-DSP 22 into CD blocks. Memory 32 coupled to block decoder 30 facilitates functions performed by block decoder 30 and also acts as buffer memory for ATAPI interface 36.

DVD-DSP 26 demodulates channel bits read from a DVD into data bytes and performs error detection and correction on the data bytes. DVD-DSP 26 also converts the DVD data into DVD data sector format data. Memory 28 coupled to DVD-DSP 26 facilitates the demodulation, error detection and correction, and data sector formatting operations.

ATAPI interface 36 facilitates the transfer of CD data blocks and DVD sector data to host system CPU 38 using a host system bus. For DVD playback, host system CPU 38 outputs the received data to MPEG decoder 40 using a host system bus, such as ISA/EISA bus. MPEG decoder 40 decompresses and separates the compressed audio and video data. The decompressed video data is output to video playback subsystem 46 for MPEG video playback. The decompressed MPEG audio is output to audio playback subsystem 44 for MPEG-audio or AC3 audio playback.

The ATAPI interface 36 and host CPU 38 are typically required for CD-ROM and DVD and DVD-ROM applications. The CD-ROM/DVD-ROM approach is also used for integrated DVD/CD player applications, but is by no means a cost effective or efficient solution for audio and video playback applications. For a DVD/CD playback system, a 2× DVD speed or a 8× CD speed is adequate for MPEG playback. Higher speeds which are generally required for CD-ROM and DVD-ROM application are not required for audio and video playback since they do not provide much difference in playback performance.

Microcontroller 48 allows the playback system user to program and control the operations of playback system 1. Microcontroller 48 allows the user to perform various housekeeping functions such as register configuration or setup of playback system 1. Microcontroller 48 facilitates this by providing read and write capabilities for the various registers and memory locations within the various subsystems of playback system 1. Microcontroller 48 also allows the user to monitor the flow of information within the various subsystems of playback system 1. Microcontroller 49 may be programmed to control the functioning of MPEG decoder 40.

As can be seen from FIG. 1, most conventional DVD/CD players use separate subsystems to process information read from CDs and DVDs since the format of the information is different. The various subsystems are generally incorporated into separate chips, each dedicated to processing information of a particular format. The separate subsystems occupy valuable real estate in the playback system and as a whole make the playback system bulky and expensive. Use of separate subsystems for information processing also results in inefficient use of system processing and memory resources and hinders efficient sharing of distributed resources. Further, an increased number of chips also increases the total pin count of playback system I making it bulky and complex. All of the above mentioned factors eventually translate to increased manufacturing costs for the playback system.

Additionally, because of low bit rate associated with CDs (user bit rate is only 1.4112 Mbit/sec for 1× CD), most conventional CD-DSP controllers use a serial interface to communicate with external subsystems such as MPEG decoder 40 or block decoder 30. The serial interface is a cost effective solution for low speed CD. Since the internal data flow in CD-DSP controllers uses a 8-bit data path, to facilitate a serial interface to the external subsystems, parallel to serial conversion is required. The external subsystem is then required to perform a serial-to-parallel conversion for further processing.

With the emergence of DVD technology, which uses a higher user bit rate (11.08 Mbit/sec for 1× DVD) than that of CD, normally a parallel interface is provided for data transfer. Therefore, in conventional DVD/CD playback systems, the MPEG decoder normally has to support an 8-bit parallel interface for DVD and a serial interface for CD. The 8-bit parallel to serial conversion at CD controller and the serial to parallel conversion at MPEG decoder not only pose an unnecessary overhead in hardware for the playback system, but also requires an 8-times higher transfer rate for the serial interface. Thus, a new transfer protocol which eliminates the serial interface associated with traditional CD-DSP controllers is desired.

Thus, there is a need for an optimized solution for a CD/DVD playback system to reduce system cost. It is desirable that the playback system process audio and video information read from optical disks in an efficient manner. It is desired that the processing subsystems of the playback system be less complex, occupy less real estate (i.e., use less silicon resulting in smaller dies), have a smaller pin count, make efficient use of memory and processing resources, and be cheaper to manufacture than conventional playback systems. It is also desired that be the playback system not restrict the CD-decoder interface to a serial interface.

SUMMARY OF THE INVENTION

The present invention relates to a controller architecture optimized for processing audio and video information in playback systems used for reproducing information stored on optical discs of different formats such as CDs and DVDs. According to one embodiment of the present invention, a DVD/CD controller is disclosed which efficiently processes audio and video information read from a CD or DVD for DVD/CD player applications. According to one aspect of the present invention, the DVD/CD controller includes a unique MPEG interface which facilitates transfer of CD data and DVD data from the DVD/CD controller to a MPEG decoder using a parallel interface. The DVD/CD controller also comprises a read channel subsystem for extracting data and clock information from an input signal and for generating digital signals corresponding to the input signal, a CD-DSP subsystem for performing sync detection and demodulation of CD data as defined by the Red Book standard, a DVD-DSP subsystem for performing sync detection and demodulation of DVD data as defined by standards published by the DVD consortium, an error code correction and detection subsystem, and a memory subsystem.

According to another aspect of the present invention, the parallel MPEG interface eliminates the need for an ATAPI interface or a host CPU for transfer of data from the front-end DSPs to the MPEG decoder. The parallel interface simplifies the data transfer from the DVD/CD controller to the MPEG decoder. Due to the simplified parallel MPEG interface, the DVD/CD controller may also be easily integrated into the MPEG decoder.

According to yet another aspect of the present invention, the parallel MPEG interface eliminates parallel-to-serial and serial-to-parallel conversion overhead problems associated with conventional DVD/CD playback systems. The parallel interface also obviates the need to transfer information at higher rates as in conventional DVD/CD playback systems.

According to another aspect of the present invention, the memory subsystem within the DVD/CD controller provides a common memory resource for the subsystems of the DVD/CD controller such as CD-DSP, DVD-DSP, and error code correction and detection subsystem. The memory subsystem thus provides efficient sharing of memory resources among the subsystems and as a result reduces the number of memory chips required for audio and video processing. This reduces the manufacturing costs of the playback system.

According to still another aspect of the present invention the DVD/CD controller includes a servo subsystem which performs servo operations based on servo error control signals received from a servo error detector, sync pattern information received from the CD-DSP and DVD-DSP, and Hall sensor output received from disc motors rotating the disc.

DVD/CD playback systems incorporating the present invention occupy less real estate, have smaller pin counts, are less complex, and are cheaper to manufacture than conventional playback systems.

DESCRIPTION OF THE SPECIFIC EMBODIMENTS

Figure 1:
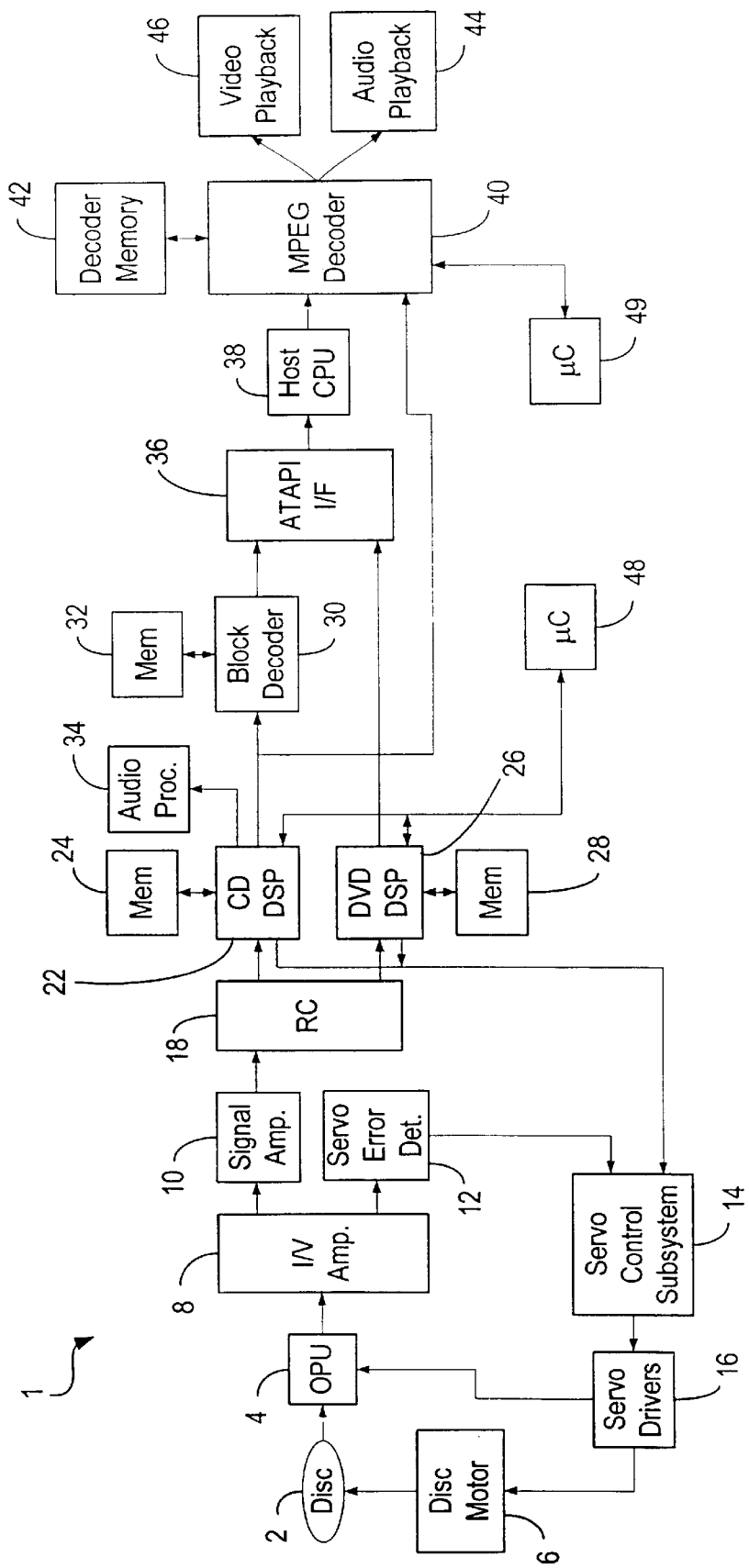
FIG. 1 depicts a prior art playback system for reproducing information stored on a disc.
Figure 2:
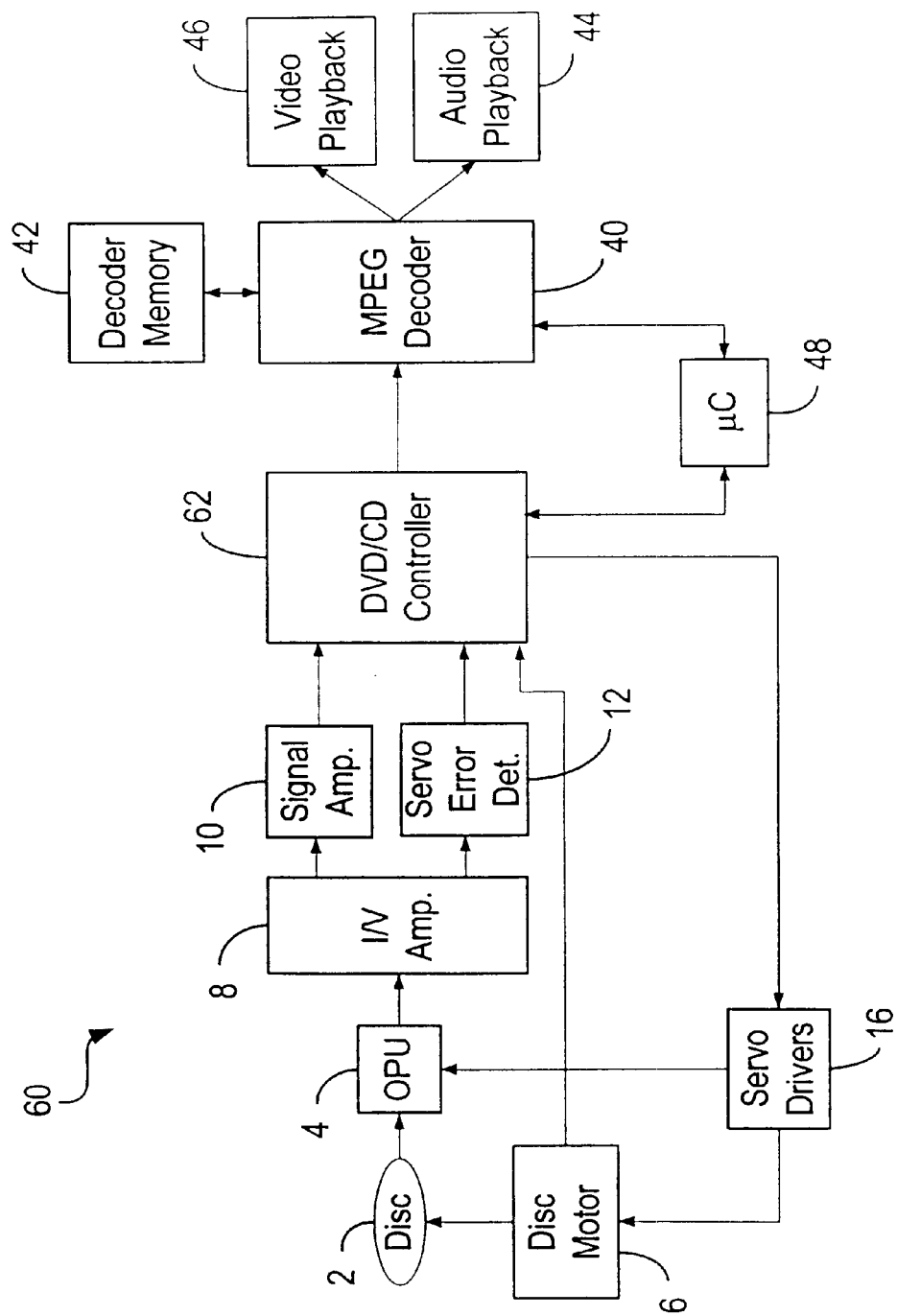
FIG. 2 depicts a playback system for reproducing information stored on a disc incorporating an embodiment of the present invention.

FIG. 2 depicts a DVD/CD playback system 60 incorporating an embodiment of the present invention. Playback system 60 is typically used for playback of audio and video information stored on a storage medium such as an optical disc, for example, a compact disc (CD) or a digital video or versatile disc (DVD). As shown, playback system 60 includes disc motor 6 for rotating disc 2, servo drivers 16, optical pickup (OPU) subsystem 4, current-voltage (IV) amplifier 8, signal amplifier 10, servo error detector 12, a novel DVD/CD controller 62 including a memory subsystem, a MPEG decoder 40 along with its associated memory 42, audio playback subsystem 44, video playback subsystem 46, and microcontroller 48. Subsystems common to playback system 60 and playback system 1, as depicted in FIG. 1, have been numbered using the same references as in FIG. 1. The functions performed by these common subsystems have been previously described. Microcontroller 48 is typically coupled to DVD/CD controller 62 and MPEG decoder 40 using a 8-bit information bus and allows the playback system user to program and control the operation of playback system 60. Microcontroller 48 may be programmed to execute command routines for DVD/CD controller 62 or MPEG decoder 40. As previously described, microcontroller 48 may also be used to monitor the information flow in DVD/CD controller 62 and MPEG decoder 40 and to perform housekeeping functions, such as register configuration or setup of playback system 60.

DVD/CD controller 62 is optimized to efficiently process audio and video information read from disc 2 for DVD/CD player applications. DVD/CD controller 62 integrates the functionality of servo control subsystem 14, read channel subsystem 18, CD-DSP 22, and DVD-DSP 26 shown in FIG. 1. DVD/CD controller 62 receives inputs from signal amplifier 10 and servo error control signals from servo error detector 12. Based on these inputs, DVD/CD controller 62 performs servo operations, bit clock and data extraction, conversion of analog input signals to digital signals, sync detection and demodulation of CD and DVD data, error detection and correction of CD and DVD data, de-scrambling of DVD data, and provides a novel parallel interface for transferring processed CD and DVD data directly to MPEG decoder 40. The unique architecture of DVD/CD controller 62 eliminates the need to have block decoder 30 or audio processor 34, as shown in FIG. 1, for processing of information read from CDs. Further, by allowing a direct transfer of CD or DVD data to MPEG decoder 40, DVD/CD controller 62 eliminates the need to have ATAPI interface 36 and host CPU 30, as depicted in FIG. 1, for transferring data to MPEG decoder 40. The parallel interface to MPEG decoder 40 simplifies the data transfer from DVD/CD controller 62 to MPEG decoder 40. Due to the simplified parallel MPEG interface, DVD/CD controller 62 may also be easily integrated into MPEG decoder 40. DVD/CD controller 62 is optimized for DVD/CD player applications and is capable of supporting 1× and 2×DVD speeds. Since the user bit rate ratio between DVD and CD is about 1:8 (DVD:CD), DVD/CD controller 62 is also capable of handling up to 16× CD playback speeds.

Figure 3:
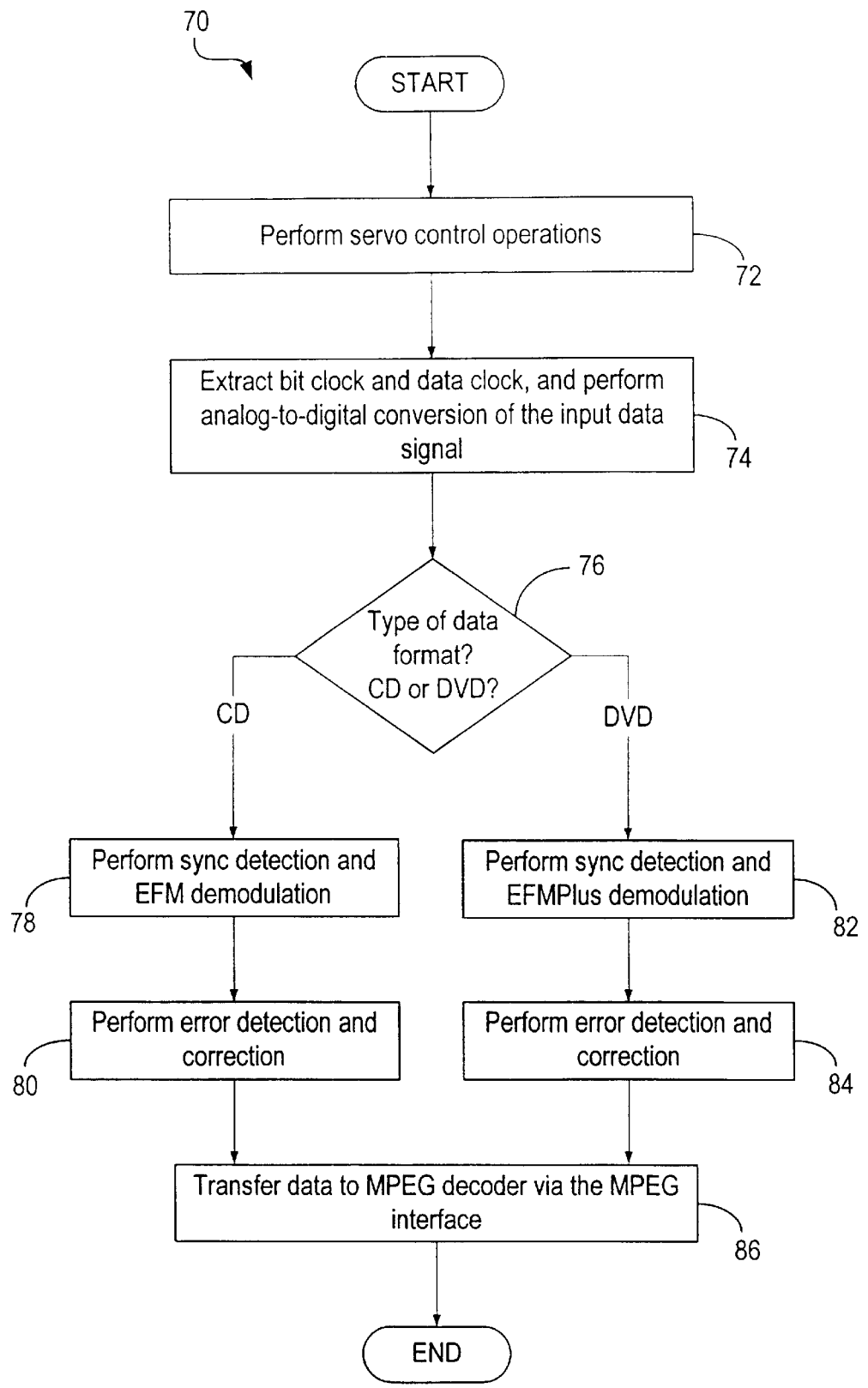
FIG. 3 depicts a flow chart showing the steps performed by a DVD/CD controller according to an embodiment of the present invention.

FIG. 3 depicts a flowchart 70 showing the steps performed by DVD/CD controller 62 for processing CD and DVD information. The steps in flowchart 70 are initiated when DVD/CD controller 62 receives an input signal from signal amplifier 10 and servo error control signals from servo error detector 12. Based on the servo error control signals, DVD/CD controller 62 performs servo control operations at step 72. Examples of servo control operations include open-loop and closed-loop operations such as sending appropriate control signals to servo drivers 16 to control the rate of rotation of disc 2, calibrating the servo signals, and sending appropriate signals to OPU 4 to minimize tracking and focus errors.

At step 74, DVD/CD controller 62 performs read channel block operations which include extracting bit clock and data clock from the signal received from signal amplifier 10, and converting the input analog signal to a digital signal using DC baseline tracking methods.

At step 76, DVD/CD controller 62 determines whether playback system 60 is operating in CD mode or DVD mode. Typically, by detecting the header information and sync patterns on the disc, DVD/CD controller 62 can differentiate between a CD and a DVD disc and thus determine the mode of operation. Additionally, controller 62 may try out CD mode and DVD mode until a proper mode is determined. If playback system 60 is operating in CD mode, at step 78, DVD/CD controller 62 performs sync detection and demodulation functions on the CD data as defined by the Red Book standard. EFM (fourteen-to-eight) demodulation techniques are used for processing CD data. At step 80, DVD/CD controller 62 performs error detection and correction of the CD information. If playback system 60 is operating in DVD mode, at step 82, DVD/CD controller 62 performs sync detection and demodulation functions on DVD data as defined by DVD standards published by the DVD Consortium. EFMPlus (sixteen-to-eight) demodulation techniques are used for processing DVD data. At step 84, DVD/CD controller 62 performs error detection and correction of the DVD data. At step 86, CD or DVD data is then directly transferred to MPEG decoder 40 via an MPEG interface.

Figure 4:
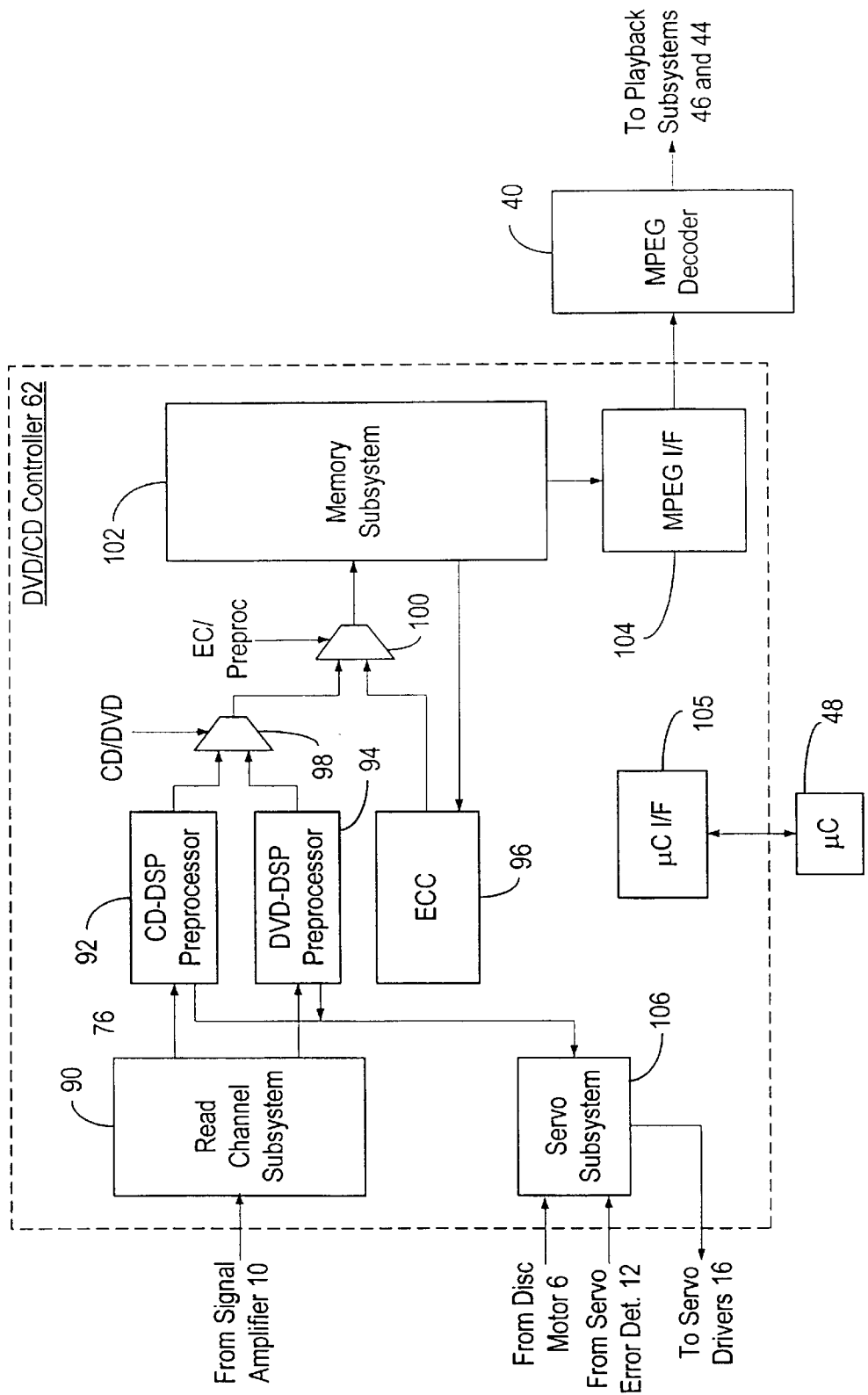
FIG. 4 depicts a detailed block diagram of the various subsystems of a DVD/CD controller according to an embodiment of the present invention.

FIG. 4 depicts a detailed block diagram of an embodiment of DVD/CD controller 62. DVD/CD controller 62 includes a servo subsystem 106, a read channel subsystem 90, a CD-DSP preprocessor 92 and a DVD-DSP preprocessor coupled to read channel subsystem 90, a multiplexer 98 receiving signals from CD-DSP preprocessor 92 and DVD-DSP preprocessor 94, error code correction and detection (ECC) subsystem 96, multiplexer 100 receiving inputs from ECC subsystem 96 and multiplexer 98, a memory subsystem 102, an MPEG interface subsystem 104 coupled to memory subsystem 102 and MPEG decoder 40, and a microcontroller interface 105 coupled to microcontroller 48. Microcontroller interface 105 is generally coupled to the various subsystems of DVD/CD controller 62 and provides an interface through which microcontroller 48 can control and monitor the operations of DVD/CD controller 62.

Servo subsystem 106 receives servo error control signals generated by servo error detector 12 as input. Servo subsystem 106 also receives Hall sensor output from disc motor 6 for the detection of disc rotation speed. As previously described, servo error control signals typically include a focus error signal, a tracking error signal, and a track-crossing pulse. Servo subsystem 106 generally is composed of four closed-loop servos, including a disc motor servo, a sled servo, a focus servo, and a tracking servo. Servo subsystem 106 also receives sync pattern information from CD-DSP preprocessor 92 and DVD-DSP preprocessor 94. Based on the servo error control signals and sync pattern information, servo subsystem 106 outputs control voltages to servo drivers 16, to correct the rotation speed of disc 2, to move the sled which houses OPU 4 to the right track, to vertically move OPU 4 to a proper distance from disc 2 for focussing purposes, or to correct off-track errors. Functions performed by servo subsystem 106 correspond to step 72 of flowchart 70 depicted in FIG. 3.

Read channel subsystem 90 receives the equalized signal from signal amplifier 10 as input. Read channel subsystem 90 converts the input analog signal to a digital signal using baseline tracking techniques. Read channel subsystem 90 also extracts clock and data information from the input signal. If playback system 60 is operating in CD mode, the digital signal is forwarded to CD-DSP preprocessor 92. If playback system 60 is operating in DVD mode, the digital signal is forwarded to DVD-DSP preprocessor 94 for further processing. Functions performed by read channel subsystem 90 correspond to step 74 of flowchart 70 depicted in FIG. 3.

CD-DSP preprocessor 92 performs sync detection and demodulation functions on the input CD data signal as defined by the Red Book standard. Typically, EFM demodulation is performed on CD data. DVD-DSP preprocessor 94 performs sync detection and demodulation functions on the input DVD data signal as defined by standards published by the DVD consortium. Typically, EFMPlus demodulation is performed on DVD data. The sync information detected by preprocessors 92 and 94 is forwarded to servo subsystem 106. Functions performed by CD-DSP preprocessor 92 correspond to step 78 of flowchart 70 depicted in FIG. 3, while finctions performed by DVD-DSP preprocessor 94 correspond to step 82 of flowchart 70. Depending on the mode of operation of playback system 60, CD or DVD, multiplexer 98 selects either the output from CD-DSP preprocessor 92 or DVD-DSP preprocessor 94 to be written to memory subsystem 102 via multiplexer 100. Multiplexer 100 determines whether to write data from the preprocessors or from ECC subsystem 96 to memory 102.

ECC subsystem 96 is responsible for performing error detection and correction for both CD and DVD data. ECC subsystem 96 reads CD or DVD data written to memory subsystem 102 by CD-DSP preprocessor 92 or DVD-DSP preprocessor 94. ECC subsystem 96 performs the read using non-sequential memory read operation which allows de-interleaving of the read data. ECC subsystem 96 then performs error detection and correction on the data as defined by the Red Book standard for CD data and by standards published by the DVD consortium for DVD data. In one embodiment, Reed-Solomon error correction codes are used for error correction purposes. After performing error detection and correction, the corrected data is written back to memory subsystem 102.

Memory subsystem 102 provides memory resources for internal operations of DVD/CD controller 62. Unlike conventional playback systems which include redundant memory resources as depicted in FIG. 1, memory subsystem 102 provides a common memory resource for processing performed by CD-DSP preprocessor 92, DVD-DSP preprocessor 94 and ECC subsystem 96. Memory subsystem 102 provides memory resources for storing data processed by preprocessors 92 and 94. This data is read by ECC subsystem 96 for error detection and correction purposes. The corrected data is written back to memory subsystem 102 and then read out from memory subsystem 102 by MPEG interface (MPEG I/F) 104 for further processing. By allowing sharing of memory resources between preprocessors 92 and 94, and ECC subsystem 96, DVD/CD controller 62 reduces the number of memory chips required for audio and video processing, thus reducing playback system complexity and cost of the playback system. A memory controller is typically associated with memory subsystem 102 for facilitating address generation, resolving memory timing issues, for performing arbitration of the memory resources, and for refreshing memory in DRAM embodiments.

Figure 5:
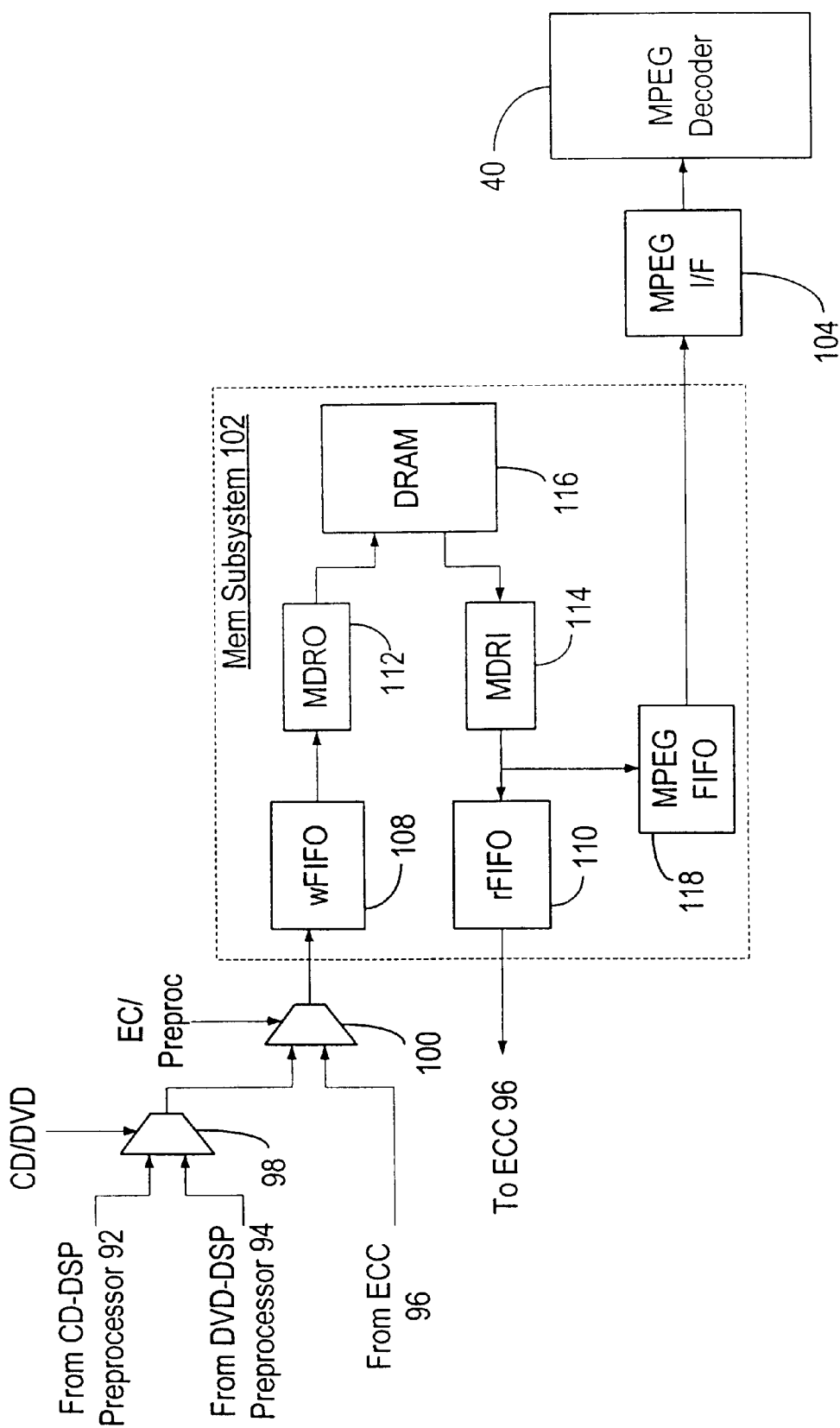
FIG. 5 depicts a detailed block diagram of a memory subsystem according to an embodiment of the present invention.

FIG. 5 depicts a detailed block diagram of memory subsystem 102. As shown, memory subsystem 102 includes a write first-in-first-out (wFIFO) buffer 108, a read first-in-first-out (rFIFO) buffer 110, a memory data output register (MDRO) 112, a memory data input register (MDRI) 114, a dynamic random access memory (DRAM) 116 providing memory resources, and a MPEG FIFO 118.

MPEG FIFO 118, wFIFO 108 and rFIFO 110 resolve access timing constraints imposed by DRAM 116. Information is stored in DRAM 116 by preprocessor 92 or 94, and ECC subsystem 96 via wFIFO 108 and MDRO 112. In a specific embodiment, wFIFO 108 is 16 bytes long and information is written to wFIFO 108 via a 8 bit bus interface from multiplexer 100. The information is then stored in DRAM 116 via MDRO 112 using a 16-bit bus interface. Processed information stored in DRAM 16 by preprocessor 92 and 94 is accessed by ECC subsystem 96 via MDRI 114 and rFIFO 110, which in a specific embodiment are 16-bytes long. ECC then performs error A detection and correction and writes back the corrected information in DRAM 116. The corrected information is then written to MPEG FIFO 118 before being forwarded to MPEG interface 104. In a specific embodiment MPEG FIFO 118 is 32-bytes long and provides a 8-bit bus interface to MPEG interface 104.

It should be apparent to one of ordinary skill in the art that the sizes of registers and buses described above are merely illustrative of one embodiment of the present invention and do not in any way restrict the scope of the present invention. Registers and busses of different sizes may be used in alternate embodiments of the present invention. Further, in alternate embodiments, the entire memory subsystem 102 may be replaced by a single static random access memory (SRAM) and its associated memory controller.

MPEG interface 104 provides an interface for transferring processed data from DVD/CD controller 62 to MPEG decoder 40. Unlike conventional playback systems which require an ATAPI interface and a host CPU for transferring data to the MPEG decoder, MPEG interface 104 is implemented such that data is directly transferred to MPEG decoder 40. By eliminating the need for an ATAPI interface or a host CPU for transfer of data to the MPEG decoder, the present invention reduces the number of subsystems required for processing audio and video information. A reduction in the number and size of subsystems translates to significant savings of playback system real estate and reduced pin counts than conventional systems. Consequently, a DVD/CD player incorporating the present invention is cheaper to manufacture than conventional DVD/CD players.

Additionally, unlike conventional playback systems which provide only a serial CD data interface to the decoder, MPEG interface 104 provides a parallel interface to MPEG decoder 40 for both CD and DVD data. By integrating the CD and DVD interfaces into one parallel interface, the present invention eliminates the parallel-to-serial and serial-to-parallel conversion overhead problems associated with prior art DVD/CD players. The present invention thus reduces the time required to process audio and video information as compared to conventional playback systems. The parallel CD interface also obviates the need to transfer information at a higher rate as in conventional serial interface systems. The slower transfer rate eases system design constraints, improves system performance and reliability, and decreases power consumption of playback system 60. Thus, by providing a parallel interface for CD and DVD data, the present invention simplifies the transfer of data from the front-end DSPs to MPEG decoder 40. Due to the simplified parallel MPEG interface, DVD/CD controller 62 may be easily integrated into MPEG decoder 40. The simplified design reduces the manufacturing cost of DVD/CD players incorporating the present invention.

MPEG interface 104 reads CD or DVD data directly from memory subsystem 102 on to a single parallel bus and forwards the data via the parallel bus to MPEG decoder 40 using proper handshaking. In a specific embodiment, MPEG interface 104 provides a 8-bit parallel interface to MPEG decoder 40.

Figure 6:
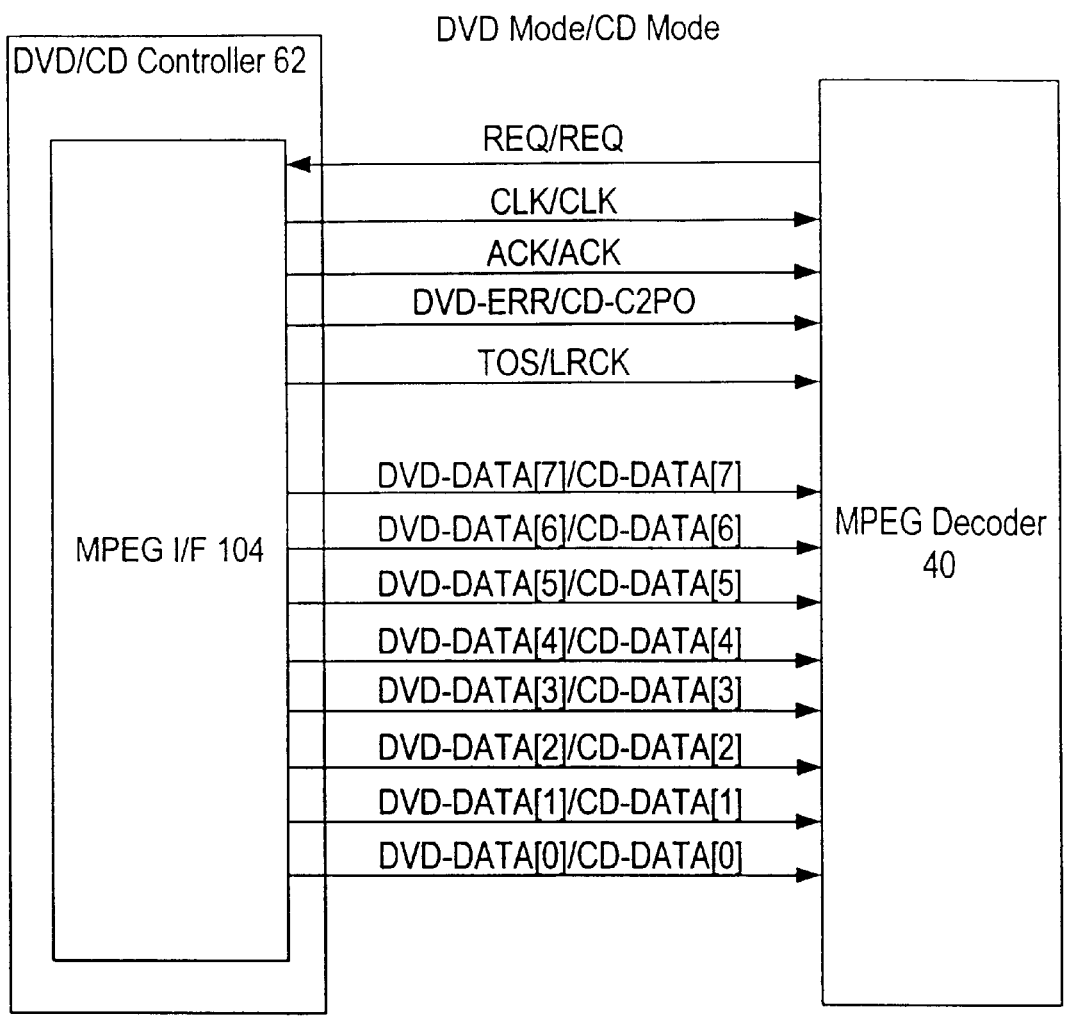
FIG. 6 depicts a parallel interface between a DVD/CD controller and a MPEG decoder for transferring data from the DVD/CD controller to the MPEG decoder according to an embodiment of the present invention.

FIG. 6 depicts a multiplexing scheme used by MPEG interface 104 in DVD and CD mode according to one embodiment of the present invention. The embodiment depicted in FIG. 6 uses a 8-bit parallel interface to MPEG decoder 40. Both CD and DVD data are output to MPEG decoder 40 in a 8-bit format through this interface. The data is output in a quasi-synchronous manner implying that the interface clock is running at all times. MPEG decoder 40 generally requests data from MPEG interface 104 by asserting a request control signal. MPEG interface 104 then generates an acknowledgment in response to the request signal and outputs data continuously on the rise of every clock as long as the request signal and the acknowledgment are continuously asserted.

As shown in FIG. 6, the interface signals between MPEG interface 104 and MPEG decoder 40 may be classified into two groups including a set of controls signals and a set of data signals. Table 1 provides a brief description of the control signals in CD and DVD mode for one embodiment of the present invention.

TABLE 1

Description of control signals between MPEG interface 104 and MPEG decoder 40

| SIGNAL | CD MODE | DVD MODE |
|---|---|---|
| REQ | Data request from MPEG decoder 40. | Data request from MPEG decoder 40. |
| CLK | Source data output clock. | Source data output clock. |
| ACK | Indicates valid data output from DVD/CD controller 62. | Indicates valid data output from DVD/CD controller 62. |
| C2PO/ERR | C1 or C2 error correction Reed-Solomon block codes. When asserted, MPEG decoder 40 either holds previous data or averages/interpolates the incoming data. | Code error flag indicating DVD-DATA[7:0] has error for one sector area. When asserted, MPEG decoder 40 either holds previous data or averages/interpolates the incoming data. |
| TOS/LRCK | Indicates start of a CD word. | Indicates top of the data sector or sector head for DVD data. |

As shown in Table 1 and FIG. 6, the DVD-ERR and the CD-C2PO signals may be multiplexed on the same pin, and the TOS and LRCK signals may be multiplexed on the same pin. Such multiplexing may reduce the number of interface pins over conventional techniques. However, multiplexing of pins is not required in order to provide the parallel interface between MPEG interface 104 and MPEG decoder 40.

Data pins [7:0] carry CD and DVD data from MPEG interface 104 to MPEG decoder 40. When MPEG decoder 40 supports a parallel CD interface, CD data is output to MPEG decoder 40 on pins CD-DATA[7:0]. The same pins provide a parallel DVD data interface (pins DVD-DATA [7:0]) when the DVD/CD player 10 is operating in DVD mode. It should be apparent to those of ordinary skill in the art that the signals depicted in FIG. 6 merely illustrate an embodiment of the present invention and do not in any way limit the scope of the present invention. In alternate embodiment, only some of the signals may be implemented, some signals may be named differently and have different meanings attributed to them, and other signals not shown in FIG. 6 may be implemented. The simplified MPEG interface used by the present invention increases the user friendliness of MPEG interface 104 and also simplifies the design of playback system 60. This in turn reduces the manufacturing cost of playback system 60.

Although specific embodiments of the invention have been described, various modifications, alterations, alternative constructions, and equivalents are also encompassed within the scope of this application. For example, the described invention is not restricted to operation within certain specific playback environments, but is free to operate within a plurality of playback environments. Additionally, although the present invention has been described using a particular series of transactions between the various subsystems of playback system 60, it should be apparent to those skilled in the art that the scope of the present invention is not limited to the described series of transactions.

While the present invention has been described using a particular combination of hardware and software, it should be recognized that other combinations of hardware and software are also within the scope of the present invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a playback system for processing information stored on a disc, wherein the information stored on the disc is in a first format or a second format, a controller coupled with a MPEG decoder for facilitating the processing of the information, the controller comprising:

a read channel subsystem configured to receive an input signal corresponding to the information, the read channel subsystem configured to generate digital signals consponding to the input signal;

a first signal processor coupled to the read channel subsystem and configured to receive the digital signals if the information is in the first format, the fit signal processor configured to perform demodulation on tie digital signas to produce first format processed data; and a second signal processor coupled to the read channel subsystem and configured to receive the digital signals if the information is in the second format, the second signal processor configured to perform demodulation on the digital signals to produce a second format processed data;

an error code correction and detection subsystem configured to receive the first format processed data if the information is in the first format and configured to receive the second format processed data if the information is in the second format, the error code correction and detection subsystem further configured to perform error detection and correction on the first format processed data and the second format processed data to produce corrected data;

a memory subsystem that includes a read first-in-first-out buffer coupled to a memory data input register and the error code correction and detection subsystem, a write first-in-first-out buffer coupled to a memory data output register, and a single memory cell coupled to the memory data output register and the memory data input register; and a parallel interface that receives the corrected data on a parallel bus interface and comprises a plurality of parallel data lines for transferring the corrected data to the MPEG decoder when the information stored on the disc is in the first format and when the information stored on the disc is in the second format.

2. The controller of claim 1 wherein:

the first format is a CD format; and the second format is a DVD format.

3. The controller of claim 1 further comprising:

a servo control subsystem configured to receive the input analog signal, the servo control subsystem configured to control servo operations based on the input analog signal.

4. The controller of claim 3 wherein:

the first signal processor is configured to extract sync data from the digital signals received from the read channel subsystem; and the second signal processor is configured to extract sync data from the digital signals received from the read channel subsystem; and the servo control subsystem is configured to control servo operations based on the sync data extracted by the first signal processor if the information is in the first format and based on the sync data extracted by the second signal processor if the information is in the second format.

5. In a player for reproducing information stored on a disc, wherein the disc is selectable from a group of discs comprising CDs and DVDs, a controller coupled with a MPEG decoder, the controller comprising:

a read channel subsystem on figured to receive an input signal corresponding to information read from the disc, the read channel subsystem configured to generate digital signals corresponding to the information read from the disc;

a CD signal processor coupled to the read channel subsystem and configured to receive the digital signals if the information is read from a CD, the CD signal processor configured to perform demodulation on the digital signals to produce CD format processed data at a parallel interface wherein the CD signal processor does not convert the CD format processed data at a serial interface;

a DVD signal processor coupled to the read channel subsystem and configured to receive the digital signals if the information is read from a DVD, the DVD signal processor configured to perform demodulation on the digital signals to produce a DVD format processed data;

an error code correction and detection subsystem configured to receive the CD format processed data if the information is read from a CD and configured to receive the DVD format processed data if the information is read from a DVD, the error code correction and detection subsystem further configured to perform error detection and correction on the CD format processed data and the DVD format processed data to produce corrected data;

a memory subsystem that includes a single memory cell coupled to the first signal processor and the second signal processor, a write first-in-first-out (FIFO) buffer, a read first-in-first-out (FIFO) buffer coupled to the error code correction and detection subsystem, and an MPEG first-in-first-out (FIFO) buffer, the single memory cell receiving data via the write FIFO buffer and providing data via the read FIFO buffer; and a parallel interface coupled to the MPEG (FIFO) buffer comprising a plurality of parallel data lines, the parallel interface configured to transfer the corrected data to the MPEG decoder when the information is read from a CD and when the information is read from a DVD.

6. In a playback system for processing information stored on a disc, wherein the disc has a format selectable from a group of formats including a fist format and a second format, a controller coupled with a MPEG decoder for facilitating the processing of the information, the controller comprising:

a read channel subsystem configured to receive an input signal corresponding to the information stored on the disc, the read channel subsystem: configured to generate digital signals corresponding to the input signal;

a first sign processor coupled to the read channel subsystem and configured to receive the digital signals if the information is in the fist format, the first signal processor configured to perform demodulation on the digital signals to produce first format processed data;

a second signal processor coupled to the read channel subsystem and configured to receive the digital signals if the information is in the second format, the second signal processor configured to perform demodulation on the digital signals to produce a second format processed data;

a memory subsystem that includes a single memory cell coupled with the first signal processor and the second signal processor, the memory cell configured to store the first format processed data if the information is in the first format and to store the second format processed data if the information is in the second format, the memory subsystem further comprising a write first-in-first-out buffer coupled to a memory data output register, a read first-in-first-out buffer coupled to a memory data input register, the single memory cell being coupled to the memory data output register and the memory data input register;

an error code correction and detection subsystem configured to receive the first format processed data if the information is in the first format and configured to receive the second format processed data if the information is in the second format via the read first-in-first-out buffer, the error code correction and detection subsystem further configured to perform error code detection and correction on the first format processed data and the second format processed data to produce corrected data; and a parallel interface that receives the corrected data from the memory subsystem on a parallel bus and comprises a plurality of parallel data lines for transferring the corrected data to the MPEG decoder when the information stored on the disc is in the first format and when the information stored on the disc is in the second format.

7. In a player for reproducing information stored on a disc, wherein the disc is selectable from a group of discs comprising CDs and DVDs, a controller coupled with a MPEG decoder, the controller comprising:
   a read channel subsystem configured to receive an input signal corresponding to information read from the disc, the read channel subsystem configured to generate digital signals corresponding to the input signal;
   a signal processor coupled to the read channel subsystem configured to receive the digital signals, the signal processor configured to process the digital signals to produce processed data at a parallel bus when the input signals arc read from a CD or a DVD;
   an error code correction and detection subsystem configured to perform error detection and correction on the processed data to produce corrected data;
   a memory subsystem that includes a single memory cell coupled to the signal processor, a write first-in-first-out (FIFO) buffer, a read first-in-first-out (FIFO) buffer, and an MPEG first-in-first-out (FIFO) interface, the single memory cell receiving data via the write FIFO buffer and providing data to the error code correction and detection subsystem via the read FIFO buffer; and
   a parallel interface coupled to the MPEG FIFO interface compromising a plurality of parallel data lines for transferring the corrected data to the MPEG decoder when the disc from which the information is read is a CD and when the disc from which the information is read is a DVD.

8. In a playback system for processing information stored on a computer-readable storage medium in a first format or in a second format, a method of processing the information, the method comprising:
   receiving an input signal corresponding to the information stored on the computer-readable storage medium;
   generating digital signals corresponding to the input sign;
   demodulating the digital signals to produce first format processed data if the information stored on the computer-readable storage medium is in the first format;
   demodulating the digital signals to produce second format processed data if the information stored on the computer-readable storage medium is in the second format;
   storing the first format and the second format processed data in a memory subsystem via a write first-in-first-out buffer and a memory data output register;
   accessing the first format and the second format processed data from the memory subsystem via a read first-in-first-out buffer and a memory data input register;
   performing error detection and correction on the first format processed data if the information is in the first format to produce corrected data;
   performing error detection and correction on the second format processed data if the information is in the second format to produce corrected data; and
   transferring the corrected data to a MPEG decoder via a parallel interface comprising a plurality of parallel data lines when the information is stored on the computer-readable storage medium in the first format and when the information is stored on the computer-readable storage medium in the second format.

9. The method of claim 8 wherein the first format is a CD format and the second format is a DVD format.

10. In a player for reproducing information stored on a disc, wherein the disc is selectable from a group of discs comprising CDs and DVDs, a method of processing the information, the method comprising:
   receiving an input signal corresponding to the information stored on the disc;
   generating digital signals corresponding to the input signal;
   demodulating the digital signals to produce CD format processed data if tho information is read from a CD;
   demodulating the digital signals to produce DVD format processed data if the information is read from a DVD;
   storing the CD format and the DVD format processed data in a memory subsystem via a write first-in-first-out buffer and a memory data output register;
   accessing the CD format processed data from the memory subsystem via a read first-in-first-out buffer and a memory data input register and performing error detection and correction on the CD format processed data if the information is read from a CD to produce corrected data;
   accessing the DVD format processed data from the memory subsystem via the read first-in-first-out buffer and the memory data input register and performing error detection and correction on the DVD format processed data if the information is read from a DVD to produce corrected data;
   writing the corrected data to an MPEG first-in-first-out buffer, and transferring the corrected data to a MPEG decoder via a parallel interface comprising a plurality of parallel data lines when the disc on which the information is stored is a CD and when the disc on which the information is stored is a DVD.

11. In a playback system for processing information stored on a disc, wherein the disc has a format selectable from a group of formats including a first format and a second format, a method of facilitating the processing of the information, the method comprising:
   receiving an input signal corresponding to the information;
   generating digital signals corresponding to the input signal;
   demodulating the digital signal to produce first format processed data if the information is in the first format;
   demodulating the digital signals to produce second format processed data if the information is in the second format;
   storing the first format and the second format processed data in a single memory cell via a write first-in-first-out buffer and a memory data output register;
   accessing the first format processed data from the single memory cell via a read first-in-first-out buffer and a memory data input register and performing error detection and correction on the first format processed data if the information is in the first format to produce corrected data;
   accessing the second format processed data from the single memory cell via the read first-in-first-out buffer and the memory data input register and performing error detection and correction on the second format processed data if the information is in the second format to produce corrected data; and
   transferring the corrected data to a MPEG decoder via a parallel interface comprising a plurality of parallel data lines when the information is stored on the disc in the first format and when the information is stored on the disc in the second format.

12. In a player for reproducing information stored on a disc, wherein the disc is selectable from a group of discs comprising CDs and DVDs, a method for processing the information, the method comprising:

receiving an input signal corresponding to information read from the disc;

generating digital signals corresponding to the input signal;

processing the digital signals to produce processed data;

storing the processed data in a memory subsystem via a write first-in-first-out buffer and a memory data output register, accessing the processed data from the memory subsystem via a read first-in-first-out buffer and a memory data input register, performing error detection and correction on the processed data to produce corrected data;

writing the corrected data to an MPEG first-in-first-out buffer; and transferring the corrected data to a MPEG decoder via a parallel interface comprising a plurality of panel data lines when the disc on which the information is stored is a CD and when the disc on which the information is stored is a DVD.

* * * * *